(12) United States Patent
Konagaya et al.

(10) Patent No.: US 9,862,840 B2
(45) Date of Patent: Jan. 9, 2018

(54) CONDUCTING COMPOSITION AND METHOD FOR PRODUCING THE SAME

(71) Applicants: National University Corporation Nagoya University, Nagoya-shi, Aichi (JP); Fuji Polymer Industries Co., Ltd., Nagoya-shi, Aichi (JP)

(72) Inventors: Shigeji Konagaya, Aichi (JP); Hitoshi Shibuya, Aichi (JP); Toshio Saruyama, Aichi (JP)

(73) Assignees: National University Corporation Nagoya University, Aichi (JP); Fuji Polymer Industries Co., Ltd., Aichi (JP)

( * ) Notice: Subject to any disclaimer, the term of this patent is extended or adjusted under 35 U.S.C. 154(b) by 0 days.

(21) Appl. No.: 15/108,994

(22) PCT Filed: Sep. 14, 2015

(86) PCT No.: PCT/JP2015/075968
§ 371 (c)(1),
(2) Date: Jun. 29, 2016

(87) PCT Pub. No.: WO2016/043145
PCT Pub. Date: Mar. 24, 2016

(65) Prior Publication Data
US 2016/0340520 A1 Nov. 24, 2016

(30) Foreign Application Priority Data

Sep. 17, 2014 (JP) .................. 2014-189018

(51) Int. Cl.
| | |
|---|---|
| *H01B 1/24* | (2006.01) |
| *C09D 5/24* | (2006.01) |
| *B32B 9/00* | (2006.01) |
| *B32B 23/02* | (2006.01) |
| *C08K 3/04* | (2006.01) |

(Continued)

(52) U.S. Cl.
CPC .............. *C09D 5/24* (2013.01); *B32B 9/00* (2013.01); *B32B 9/04* (2013.01); *B32B 23/00* (2013.01); *B32B 23/02* (2013.01); *C08J 5/18* (2013.01); *C08K 3/04* (2013.01); *C08K 3/22* (2013.01); *C08K 5/00* (2013.01); *C08K 5/13* (2013.01); *C08L 1/02* (2013.01); *C08L 101/00* (2013.01); *C09D 7/1216* (2013.01); *C09D 7/1233* (2013.01); *C09D 7/1266* (2013.01); *C09D 7/1283* (2013.01); *C09D 7/1291* (2013.01); *C09D 101/02* (2013.01); *C09D 167/00* (2013.01); *C09K 5/14* (2013.01); *H01B 1/04* (2013.01); *H01B 1/24* (2013.01); *B32B 2307/30* (2013.01); *B32B 2307/302* (2013.01); *B32B 2307/50* (2013.01); *C08J 2301/02* (2013.01);

(Continued)

(58) Field of Classification Search
CPC .......... B32B 2307/30; B32B 2307/302; B32B 2307/50; B32B 23/00; B32B 23/02; B32B 9/00; B32B 9/04; C08J 2301/02; C08J 3/20; C08J 5/18; C08K 2003/2227; C08K 2201/003; C08K 3/04; C08K 3/22; C08K 5/00; C08K 5/13; C08L 101/00; C08L 1/02; C08L 2205/16; C09D 101/02; C09D 167/00; C09D 5/24; C09D 7/12; C09D 7/1216; C09D 7/1233; C09D 7/1266; C09D 7/1283; C09D 7/1291; C09K 5/14; H01B 1/04; H01B 1/24

See application file for complete search history.

(56) References Cited

U.S. PATENT DOCUMENTS

| | | |
|---|---|---|
| 7,071,258 B1 | 7/2006 | Jang et al. |
| 2010/0096597 A1 | 4/2010 | Prud'Homme et al. |

(Continued)

FOREIGN PATENT DOCUMENTS

| | | |
|---|---|---|
| JP | 2006-035647 | 2/2006 |
| JP | 2008-248033 | 10/2008 |

(Continued)

OTHER PUBLICATIONS

Shateri-Khalilabad et al., "Preparation of superhydrophobic electrocondcutive graphene-coated cotton cellulose," Cellulose, 20, pp. 963-972 (2013).*

(Continued)

*Primary Examiner* — Mark Kopec
*Assistant Examiner* — Jaison P Thomas
(74) *Attorney, Agent, or Firm* — Hamre, Schumann, Mueller & Larson, P.C.

(57) ABSTRACT

A conducting composition of the present invention includes a cellulose nanofiber and a fine particle. The conducting composition includes (A) a cellulose nanofiber, and (B) at least one type of an inorganic powder selected from graphene, graphene oxide, and derivatives thereof. A method for producing the conducting composition includes preparing a dispersion by adding water or a mixed solvent of water and a hydrophilic solvent to (A) a cellulose nanofiber and (B) at least one type of an inorganic powder selected from graphene, graphene oxide, and derivatives thereof, and removing the water or the mixed solvent of water and a hydrophilic solvent from the dispersion. Accordingly, the present invention provides a conducting composition that utilizes a cellulose nanofiber and an inorganic powder having the conductivity at a nano-scale size, can improve the conductivity, and further can have properties such as anisotropy and transparency.

14 Claims, No Drawings

(51) Int. Cl.

| | | |
|---|---|---|
| *C09D 101/02* | (2006.01) | |
| *C08K 5/00* | (2006.01) | |
| *C08K 5/13* | (2006.01) | |
| *C08L 1/02* | (2006.01) | |
| *C08L 101/00* | (2006.01) | |
| *C08J 5/18* | (2006.01) | |
| *C08K 3/22* | (2006.01) | |
| *C09D 7/12* | (2006.01) | |
| *C09K 5/14* | (2006.01) | |
| *C09D 167/00* | (2006.01) | |
| *H01B 1/04* | (2006.01) | |
| *B32B 9/04* | (2006.01) | |
| *B32B 23/00* | (2006.01) | |

(52) U.S. Cl.
CPC ............... *C08K 2003/2227* (2013.01); *C08K 2201/003* (2013.01); *C08L 2205/16* (2013.01)

(56) References Cited

U.S. PATENT DOCUMENTS

| | | | |
|---|---|---|---|
| 2013/0210955 A1 | 8/2013 | Inui et al. | |
| 2013/0214211 A1 | 8/2013 | Lehmann et al. | |
| 2014/0091253 A1 | 4/2014 | Myllymaki et al. | |
| 2014/0134415 A1* | 5/2014 | Gong | C08J 9/28 428/219 |
| 2015/0111449 A1* | 4/2015 | Cruz-Silva | C01B 31/0484 442/153 |
| 2015/0368108 A1* | 12/2015 | Sone | H01B 1/24 252/510 |

FOREIGN PATENT DOCUMENTS

| | | | |
|---|---|---|---|
| JP | 2010-506014 | 2/2010 | |
| JP | 2012-051991 | 3/2012 | |
| JP | 2012-236983 | 12/2012 | |
| JP | 2013-216766 | 10/2013 | |
| JP | 2014-502289 | 1/2014 | |
| JP | 2015-048358 | 3/2015 | |
| WO | 2012/029946 | 3/2012 | |
| WO | 2014/049212 | 4/2014 | |
| WO | WO 2014/115560 * | 7/2014 | ............. C01B 31/02 |

OTHER PUBLICATIONS

"Refractive Index of Polymers by Index," Scientific Polymer Products, Inc. webpage, http://scientificpolymer.com/technical-library/refractive-index-of-polymers-by-index/ (2013).*
Gao et al., "Cellulose nanofibers/reduced graphene oxide flexible transparent conductive paper," Carbohydrate Polymers 97 (2013) 243-251 (Year: 2013).*
Javadi, et al., "Polyvinyl Alcohol-Cellulose Nanofibrils-Graphene Oxide Hybrid Organic Aerogels", ACS Applied Materials & Interfaces, vol. 5, No. 13, Jul. 10, 2013, pp. 5969-5975.
Shimazaki, et al., "The development of a transparent high thermal conducting film using a cellulose nanofiber", Polyfile, Sep. 2011, pp. 22-25, with a partial English translation.
Zhu, et al., "Highly Thermally Conductive Papers with Percolative Layered Boron Nitride Nanosheets", ACS Nano, vol. 8, No. 4, 2014, pp. 3606-3613.

* cited by examiner

US 9,862,840 B2

CONDUCTING COMPOSITION AND METHOD FOR PRODUCING THE SAME

TECHNICAL FIELD

The present invention relates to a conducting composition and a method for producing the same. Specifically, the present invention relates to a conducting composition that can control anisotropy, has characteristics such as transparency and high flexibility, and is useful as a sheet, a film, a coating, or the like. The present invention also relates to a method for producing the conducting composition.

BACKGROUND ART

As a conducting material, a polymer film or a polymer sheet having a highly conducting inorganic particle is one of the important materials and technical fields of the industry. Some of the present inventors propose efficient production of a cellulose nanofiber (Patent Document 1), and a conductive film formed of a water-dispersible polymer in which the cellulose nanofiber is dispersed in a conductive polymer (Patent Document 2). The cellulose nanofiber is electrically insulating. Nevertheless, some of the present inventors suggest that the combination of the cellulose nanofiber with the conductive polymer improves the conductivity of the composition.

PRIOR ART DOCUMENTS

Patent Documents

Patent Document 1: JP 2012-051991A
Patent Document 2: JP 2012-236983 A

DISCLOSURE OF INVENTION

Problems to be Solved by the Invention

However, the conductivity is still insufficient in the above conventional technologies, and therefore higher conductivity is desired.

The present invention provides a conducting composition that utilizes a cellulose nanofiber and an inorganic powder having the conductivity at a nano-scale size, can improve the conductivity, and further can have properties such as anisotropy and transparency, and a method for producing the same.

Means for Solving Problem

A conducting composition of the present invention includes a cellulose nanofiber and a fine particle. The conducting composition includes (A) a cellulose nanofiber, and (B) at least one type of an inorganic powder selected from graphene, graphene oxide, and derivatives thereof.

A method for producing a conducting composition of the present invention includes preparing a dispersion by adding water or a mixed solvent of water and a hydrophilic solvent to (A) a cellulose nanofiber and (B) at least one type of an inorganic powder selected from graphene, graphene oxide, and derivatives thereof, and removing the water or the mixed solvent of water and a hydrophilic solvent from the dispersion, thereby providing the conducting composition.

EFFECTS OF THE INVENTION

The composition of the present invention includes (A) the cellulose nanofiber and (B) at least one type of the inorganic powder selected from graphene, graphene oxide, and derivatives thereof, and thus has high conductivity that cannot be achieved by the component (B) alone. That is, even a composition containing only a small amount of fine particles can exhibit high conductivity because the cellulose nanofiber efficiently adsorbs the component (B). Furthermore, a composition may also include a polymer matrix of the component (E), which allows the composition to have more excellent conductivity. Additionally, properties such as anisotropic conductivity and transparency can be imparted to those compositions. Therefore, compositions can be applied to, e.g., conductive and/or antistatic films or sheets, or a coating material formed on a substrate.

DESCRIPTION OF THE INVENTION

The present inventors conducted numerous studies based on the idea that the conductivity may be increased by causing the cellulose nanofiber to adsorb a conducting fine particle. The fiber diameter of the cellulose nanofiber is several tens of nanometers. The present inventors conceived that it is highly possible to obtain a material having unprecedented properties by using a material with a size that is close to the fiber diameter of the cellulose nanofiber, for example, such as graphene having a nano-order thickness.

The cellulose nanofiber of the component (A) used in the present invention is obtained by fibrillating a cellulose fiber, and examples of the cellulose fiber include plant-derived fibers, fibers separated from animal fibers, and bacterial cellulose. Of these, the cellulose fiber separated from vegetable fibers is preferable. The cellulose fiber may be purified chemically or physically, and then fibrillated to obtain the cellulose nanofiber. The cellulose nanofiber thus obtained has an average fiber diameter of preferably 10 to 500 nm, more preferably 10 to 100 nm, and still more preferably 10 to 50 nm. The cellulose nanofiber has an indefinite length and appears to be a highly branched continuous fiber when observed under a potential microscope. Here, "fibrillation" means that fibers in a massive state are to be separated from each other, and in a liquid, "fibrillation" means that fibers are to be dispersed. Even a composition containing only a small amount of conducting fine particle can exhibit high conductivity because the cellulose nanofiber efficiently adsorbs the component (B).

Examples of the method for producing the cellulose nanofiber include a physical production method and a chemical production method. The physical production method is a method for fibrillating the cellulose fiber by performing a physical treatment on a material containing the cellulose fiber. The chemical production method is a method for fibrillating the cellulose fiber by performing the physical treatment after performing a chemical treatment (oxidization etc.) for facilitating the fibrillation on the cellulose material. The physical production method is a method for fibrillating the cellulose fiber by applying a high shear to a dispersion in which the cellulose material is dispersed in water etc. The means for applying a high shear include a bead mill, a blender type dispersing machine, a high speed rotation homogenizer, a high pressure homogenizer, a high-pressure injection treatment, and an ultrasonic dispersing machine.

Although water is generally used as a dispersion medium for a dispersion, a water-soluble organic solvent or a mixed solvent of water and a water-soluble organic solvent may also be used. An acid or alkali, an ionic or non-ionic dispersant or surfactant, an inorganic salt, or the like may be added to the dispersion medium.

The chemical methods for fibrillation include an oxidation treatment. The oxidation treatment is preferably performed using an N-oxyl compound and an oxidizing agent.

The cellulose nanofiber of the component (A) is preferably used in the form of a dispersion in which the cellulose nanofiber is dispersed in water, a water-soluble organic solvent, or a mixed solvent of water and a water-soluble organic solvent. It is preferable that the cellulose nanofiber concentration in the dispersion is in a range from 0.1 to 10 mass %. The cellulose nanofiber concentration below the above range is not preferable because it requires much time for removing the aqueous solvent when producing the composition of the present invention. The cellulose nanofiber concentration over the above range is not preferable because excessive viscosity can make it difficult to produce the composition of the present invention, and is likely to result in a nonuniform composition.

The graphene of the component (B) used in the present invention is a thin-layer graphite, including a single-layer graphite and a cleaved graphite having two or more layers. The graphene oxide is produced by oxidizing the graphite, including a single-layer graphite oxide and a cleaved graphite oxide having two or more layers. The derivatives of such graphene and graphene oxide may be used. The derivatives are commonly obtained by chemically modifying the surface of the graphene and the graphene oxide. The graphene or the graphene oxide is a thin layer having a thickness of several nm. The size of the graphene and the graphene oxide in the surface direction can be measured as an average particle diameter by a light scattering method. Although the graphene, the graphene oxide, and the derivatives thereof used in the present invention may have any average particle diameter, those having an average particle diameter of 2 μm or more and 50 μm or less are preferred to achieve high conductivity.

Although no particular limitation is imposed on the compositions of the component (A) and the component (B), it is preferable that the content of the component (A) is 5 to 98 mass % and that of the component (B) is 2 to 95 mass % relative to the total mass of the components (A) and (B). The content of the component (B) is more preferably 5 mass % or more and 90 mass % or less, and particularly preferably 10 mass % or more and 80 mass % or less relative to the total mass of the components (A) and (B). The content of the component (B) less than 2 mass %, or more than 95 mass % hardly exhibit an effect of improving the conductivity. The present invention relates to a conducting composition including the components (A) and (B). It is preferred that the total amount of the components (A) and (B) is 5 mass % or more when the amount of the conducting composition is 100 mass %.

It is preferred to use a reducing agent as a component (C) when the component (B) contains the graphene oxide or derivatives thereof. Examples of the reducing agent include hydrazine and pyrogallol, and other reducing agents may also be used. Although no particular limitation is imposed on the amount of the reducing agent, it is preferred to use 1 to 50 mass % of the reducing agent with respect to the amount of the graphene oxide to be used as the component (B). The use of the reducing agent is especially preferred when the content of the graphene oxide is high or when polymers as described below are used.

The composition of the present invention preferably includes an anionic dispersant as a component (D). The anionic dispersant used as the component (D) preferably includes at least one group selected from the group consisting of a carboxyl group, a sulfo group, a phosphoric acid group, or salts thereof (a carboxylate group, a sulfonate group, or a phosphate group). Specific examples of the anionic dispersant include pyrophosphoric acid, polyphosphoric acid, tripolyphosphoric acid, tetrapolyphosphoric acid, metaphosphoric acid, trimetaphosphoric acid, tetrametaphosphoric acid, hexametaphosphoric acid, polyacrylic acid, polymethacrylic acid, polyitaconic acid, orthosilicic acid, metasilicic acid, phosphonic acid, polymaleic acid copolymer, humic acid, tannic acid, dodecyl sulfuric acid, dodecylbenzenesulphonic acid, polystyrene sulphonic acid, lignin sulphonic acid, a sulfonic acid group bonded polyester and/or salts thereof. In addition, copolymers with maleic acid, fumaric acid, etc., are preferred. The component (D) used in the present invention also includes a polyaniline derivative treated with sulfonic acid etc. As the polyaniline derivative, a polymer obtained by polymerizing an aniline derivative that is synthesized at a monomer stage may be used. Although no particular limitation is imposed on the amount of the component (D) used, the amount of the component (D) is preferably about 0.05 to 1 times as much as the amount of the component (A).

In the composition of the present invention, a polymer may be used as a component (E). The use of the component (E) enables the composition to have the effects of improving flexibility, mechanical strength, transparency, and adhesion to other materials that come into contact with the composition. Examples of the polymer of the component (E) include polyolefin such as polyethylene or polypropylene, chlorinated polyolefin, fluorinated polyolefin, polystyrene, polyester, polyamide, polyacetal, polycarbonate, polyethylene glycol, polyethylene oxide, polyacrylic acid, polyacrylic acid ester, polymethacrylic acid ester, and polyvinyl alcohol. Moreover, the component (E) can be, e.g., an epoxy resin, a urethane resin, an acrylic resin, a silicone resin, and precursors thereof, which are to be cured by heat or ultraviolet irradiation after the applied composition is dried. The curable polymers may finally become resinous or elastomeric polymers.

The component (A) is hydrophilic, and, e.g., a water-soluble polymer, a water-dispersible polyamide, polyethylene glycol, a polyacrylic acid-based copolymer, a polymethacrylic acid-based copolymer, a polyacrylic acid ester-based copolymer, a polymethacrylic acid ester-based copolymer, a polyester-based copolymer, and polyvinyl alcohol are suitable for fine dispersion of the components.

However, the use of the component (E) in the composition of the present invention does not depend on whether it is hydrophobic or hydrophilic. The present invention is characterized in that even a hydrophobic polymer can be used in the composition of the present invention. No limitation is imposed on the amount of the component (E) used as long as the effects of the composition of the present invention are maintained. In other words, the amount of the component (E) used is determined according to the intended use of the composition of the present invention.

It is preferable that the polymer component of the component (E) has a refractive index in a range from 1.45 to 1.60. The refractive index within the above range can improve the transparency of the composition of the present invention.

The components (A) and (B), and optionally the components (C) to (E) are dispersed in a mixed solvent of water and a hydrophilic solvent to form a dispersion. The composition of the present invention can be molded after removing the mixed solvent of water and a hydrophilic solvent from the dispersion. No limitation is imposed on the method of removing the mixed solvent of water and a hydrophilic solvent in the production of the composition of the present invention. Examples of specific method include volatilization, filtration, and centrifugation.

It is preferable that the molded composition is heated at a temperature in a range from 80° C. to 200° C. to remove the mixed solvent of water and a hydrophilic solvent completely. When performing heating, simultaneous heating and pressing can adjust the shape of the molded composition. When the composition includes the graphene oxide and/or derivatives thereof as the component (B), and further includes the component (C), this heat treatment is particularly preferable because it can improve the conductivity of the composition.

When the component (E) is a hydrophobic polymer, a pre-form may be prepared in the above manner from the dispersion in which the components (A) and (B), and optionally the components (C) and (D) are dispersed in the mixed solvent of water and a hydrophilic solvent. Then, the preform may be impregnated with the component (E), thus producing the composition of the present invention. During the impregnation, it is effective to decompress the system. When the component (E) is a thermosetting polymer, a pre-polymer composition may be prepared by mixing the component (E) with a cross-linking agent or a curing catalyst. Then, the preform may be impregnated with the pre-polymer composition. The composition impregnated with the component (E) may be finally molded by a heat treatment or hot press into the composition of the present invention.

The composition of the present invention may include, if necessary, reinforcing fillers, bulking fillers, other conducting fillers, conducting compounds, thermally conducting fillers, polymers for adjusting physical properties, plasticizers, and additives for improving heat resistance, UV resistance, light resistance, oxidation resistance, and flame retardancy. These materials may be used as long as they do not impair the original purpose of the composition of the present invention.

It is preferable that the composition of the present invention has a volume resistance value of $3.1 \times 10^9$ Ω·cm or less. The composition having the volume resistance value within the above-range can be used as a conducting composition.

In the present invention, at least one type of an inorganic powder selected from a metal oxide and a diamond having an average particle diameter of 50 nm or less may further be added. The addition of this inorganic powder can provide the composition having both conductivity and thermal conductivity. The preferred average particle diameter of the inorganic particle is 2 nm or more and 50 nm or less. The examples of the metal oxide include aluminum oxide, zinc oxide, zirconium oxide, silicon oxide, iron oxide, and titanium oxide. The metal oxide may be a mixture of a plurality of metals. These metal oxides need to have an average particle diameter of 50 nm or less. If the average particle diameter is larger than this value, the metal oxide cannot have a synergistic effect with the component (A).

Among these metal oxides, alumina and silica exhibit high effects and are preferable. The alumina having an average particle diameter of 50 nm or less includes a-alumina and y-alumina, and both can be used effectively. In general, silica having an average particle diameter of 50 nm or less is amorphous silica, and examples of the amorphous silica include dry silica obtained by oxidizing silicon tetrachloride or the like in an oxyhydrogen flame, and wet silica obtained by neutralizing water glass. Regardless of the production process, silica having an average particle diameter of 50 nm or less may be used in the present invention.

It is necessary that the diamond used in the present invention has an average particle diameter of 50 nm or less, and such a diamond is generally produced by detonation method.

The metal oxide or diamond having an average particle diameter of 50 nm or less may be subjected to surface treatment or substitution of a surface functional group.

Although such surface-treated or surface functional group-substituted metal oxide and diamond can be used, those having hydrophilicity are preferable and those having dispersibility in water are more preferable to have a synergistic effect with the component (A).

EXAMPLES

Next, the present invention is further specifically described by way of examples and comparative examples. It should be noted that the present invention is not limited to those examples. In the following examples, % indicates mass %.

<Method for Measuring the Average Particle Diameter>

The average particle diameter of the graphene oxide was measured by a light scattering method using "Zeta-potential & Particle size Analyzer ELS-Z" manufactured by Otsuka Electronics Co., Ltd. The values of the average particle diameters of nano alumina and nanodiamond are those indicated in technical documents provided by the manufacturer.

Examples 1-6, Comparative Examples 1-2

A water-based graphene oxide dispersion (manufactured by NiSiNa materials Co. Ltd. (solid content 0.5%, average particle diameter 11 μm)), aqueous cellulose nanofiber dispersion (trade name "BiNFi-s Wma-10002" (solid content 2%) manufactured by Sugino Machine Limited), and water-dispersible polyester resin (trade name "VYLONAL MD-1200" (solid content 34%) manufactured by TOYOBO CO., LTD.), were mixed and diluted with water to have a solid concentration of 8.0%, which then was subjected to an ultrasonic dispersion treatment for 30 minutes, so that a water-based dispersion of a composition was prepared. Subsequently, the aqueous dispersion was subjected to centrifugal defoaming to prepare a mixed aqueous dispersion. The composition ratios of Examples 1 to 6 are shown in Table 1. Comparative Examples 1 and 2, that are compositions not containing the cellulose nanofiber, are also shown in Table 1. The mass ratio in the table is expressed in parts by mass of each component per 1 part by mass of a water-dispersible polyester resin. 500 μl of the mixed aqueous dispersion was dropped on a glass plate (26 mm×24 mm) mounted on a hotplate heated at a temperature of 80° C., and allowed to stand until the sample was solidified. The sample was heat treated in an oven at a temperature of 100° C. for 30 minutes, thereby forming a thin film of the present invention coated on a glass plate. A surface resistance value was measured, and a volume resistance value was calculated from the surface resistance value. The mass ratio and the volume resistance value of these thin films are shown in Table 1.

TABLE 1

| | Composition (mass ratio with respect to 1 part by mass of polyester resin) | | Volume resistance value |
|---|---|---|---|
| | Graphene oxide | Cellulose nanofiber | ($\Omega \cdot cm$) |
| Ex. 1 | 0.04 | 0.05 | $5.0 \times 10^9$ |
| Ex. 2 | 0.04 | 0.10 | $3.1 \times 10^9$ |
| Ex. 3 | 0.04 | 0.50 | $3.7 \times 10^8$ |
| Comparative Ex. 1 | 0.04 | 0.00 | $9.2 \times 10^{10}$ |
| Ex. 4 | 0.10 | 0.05 | $5.7 \times 10^8$ |
| Ex. 5 | 0.10 | 0.10 | $3.2 \times 10^8$ |
| Ex. 6 | 0.10 | 0.50 | $4.0 \times 10^7$ |
| Comparative Ex. 2 | 0.10 | 0.00 | $4.8 \times 10^9$ |

As shown in Table 1, the volume resistance value of the composition containing 0.1 parts by mass of the graphene oxide having no cellulose nanofiber (Comparative Example 2) was $4.8 \times 10^9$ $\Omega \cdot cm$, while the volume resistance of the composition that contains 0 04 parts by mass of the graphene oxide and 0.50 parts by mass of the cellulose nanofiber (Example 3) was $3.7 \times 10^8$ $\Omega \cdot cm$. Even though the content of the graphene oxide in Example 3 is less than half of that in Comparative Example 2, Example 3 showed a smaller volume resistance and excellent conductivity. Moreover, the composition containing 0.10 parts by mass of the graphene oxide and 0.50 parts by mass of the cellulose nanofiber (Example 6) showed a high conductivity with the volume resistance value of $4.0 \times 10^7$ $\Omega \cdot cm$. As described above, it is confirmed that even the composition containing only a small amount of the graphene oxide particle exhibits high conductivity because the cellulose nanofiber efficiently adsorbs the graphene oxide. Additionally, each thin film of the respective Examples was transparent.

Examples 7 and 8

A mixed aqueous dispersion was prepared in the same way as in Examples 1 to 6, and Comparative Examples 1 and 2 except that as a reducing agent, 0.05 parts by mass of a pyrogallol per 1 part by mass of water-dispersible polyester resin was added. The composition ratios of Examples 7 and 8 are shown in Table 2. 500 µl of the mixed aqueous dispersion was dropped on a glass plate (length 26 mm×width 24 mm) mounted on a hotplate heated at a temperature of 70° C., and allowed to stand until the sample was solidified. The sample was heat treated in an oven at a temperature of 100° C. for 60 minutes, and further heat treated in an oven at a temperature of 150° C. for 60 minutes to obtain a thin film of the present invention coated on a glass plate. A surface resistance vale of the resultant thin film was measured and a volume resistance value thereof was calculated from the surface resistance value. The mass ratio and the volume resistance value of these thin films are shown in Table 2.

TABLE 2

| | Composition (mass ratio with respect to 1 part by mass of polyester resin) | | Value of volume resistance |
|---|---|---|---|
| | Graphene oxide | Cellulose nanofiber | ($\Omega \cdot cm$) |
| Ex. 7 | 0.05 | 0.30 | $1.2 \times 10^5$ |
| Ex. 8 | 0.10 | 0.30 | $3.3 \times 10^2$ |

As shown in Table 2, when a reducing agent is added to the composition containing the graphene oxide and the cellulose nanofiber and which then was heat treated, the volume resistance of the composition was significantly reduced and the conductivity of the composition was greatly improved. In particular, Example 8 showed an extremely low volume resistance value of $3.3 \times 10^2$ $\Omega \cdot cm$. As is apparent from the above Examples 7 and 8, it is confirmed that even the composition containing only a small amount of the graphene oxide particle exhibits high conductivity because the cellulose nanofiber efficiently adsorbs the graphene oxide. Additionally, each thin film of respective Examples was transparent.

INDUSTRIAL APPLICABILITY

The composition of the present invention can be used for various applications such as films, sheets, a coating material formed on a substrate, coatings, inks, or the like.

The invention claimed is:

1. A conducting composition including a cellulose nanofiber and a fine particle the composition comprising:
    (A) a cellulose nanofiber; and
    (B) at least one inorganic powder selected from the group consisting of graphene, graphene oxide, and derivatives thereof,
    wherein the component (A) adsorbs component (B), and the inorganic powder of the component (B) has an average particle diameter of 2 µm or more.

2. The conducting composition according to claim 1, wherein a content of the component (A) is in a range from 5 to 98 mass % and a content of the component (B) is in a range from 2 to 95 mass %, when a total mass of the components (A) and (B) is 100 mass %.

3. The conducting composition according to claim 1, further comprising a reducing agent as a component (C).

4. The conducting composition according to claim 1, further comprising an anionic dispersing agent as a component (D).

5. The conducting composition according to claim 1, further comprising a polymer as a component (E).

6. The conducting composition according to claim 5, wherein the polymer of the component (E) has a refractive index in a range from 1.45 to 1.60.

7. A method for producing the conducting composition according to claim 1,
    the method comprising:
        preparing a dispersion by adding water or a mixed solvent of water and a hydrophilic solvent to the component (A), which is the cellulose nanofiber, and the component (B), which is the at least one inorganic powder selected from the group consisting of graphene, graphene oxide, and derivatives thereof; and
        removing the water or the mixed solvent of water and a hydrophilic solvent from the dispersion.

8. The method according to claim 7,
    wherein the composition is formed into a predetermined shape by heat treatment at a temperature in a range from 80° C. to 200° C. after removing the water or the mixed solvent of water and a hydrophilic solvent from the dispersion.

9. The method according to claim 7,
    wherein the composition comprises the at least one inorganic powder selected from the group consisting of the graphene oxide and the derivatives thereof as the component (B), and further comprises a reducing agent as a component (C) is heat treated at a temperature in a range from 80° C. to 200° C. so as to improve conductivity.

10. The method according to claim 7, wherein the composition is impregnated with a polymer of a component (E) after removing the water or the mixed solvent of water and a hydrophilic solvent from the dispersion.

11. The method according to claim 10, wherein the composition is impregnated with the polymer of the component (E), and then the component (E) is cured.

12. A sheet, a film, or a coating, which is formed of the conducting composition according to claim 1 on a substrate.

13. The conducting composition according to claim 1, wherein the conducting composition has electrical conductivity.

14. The conducting composition according to claim 1, wherein the conducting composition has electrical conductivity and thermal conductivity.

* * * * *